Dec. 31, 1940.　　　J. M. BRYANT　　　2,227,064
ANTIFRICTION BEARING
Filed July 27, 1940　　　3 Sheets-Sheet 1
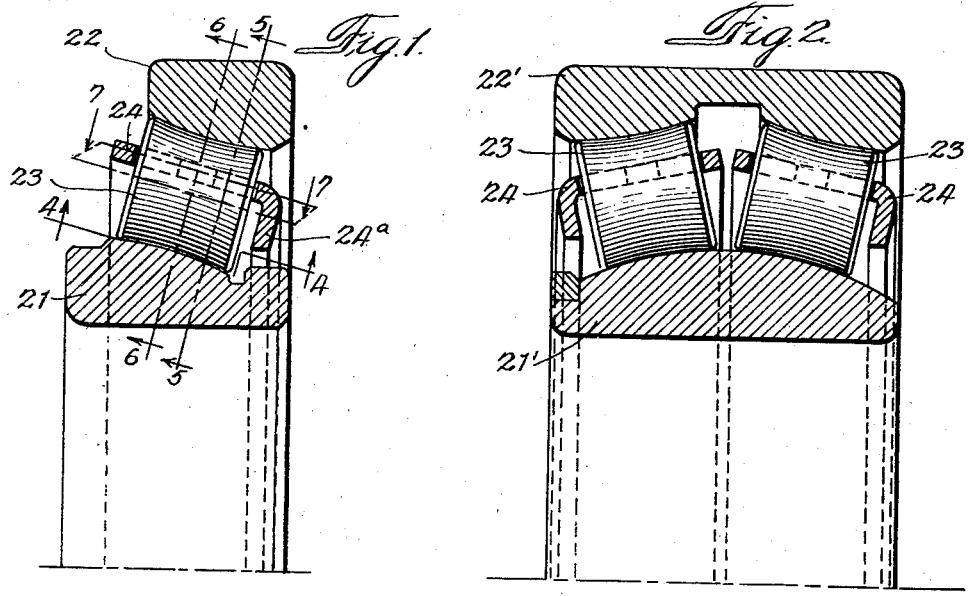
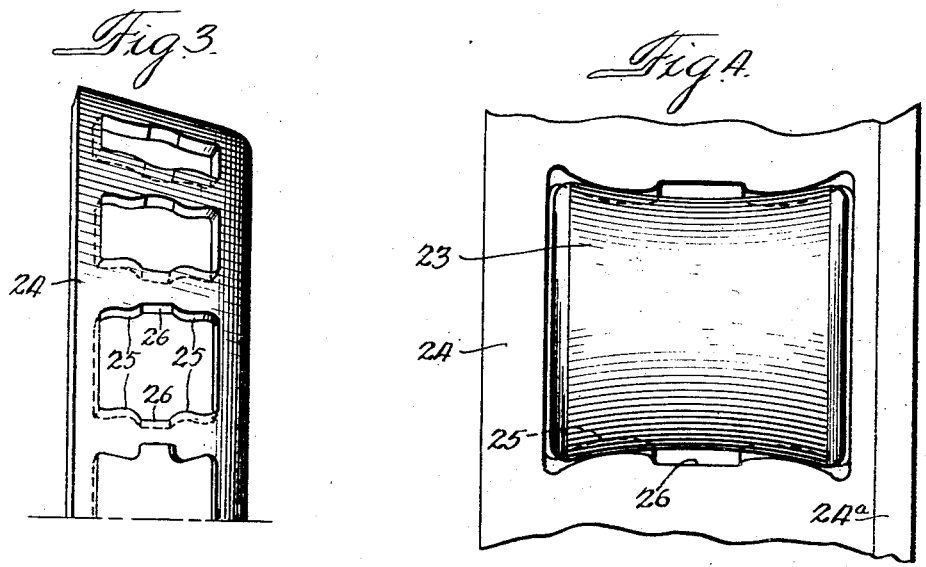
Inventor
Jerrus M. Bryant
By Thiess, Olson & Mecklenburger
Attys.

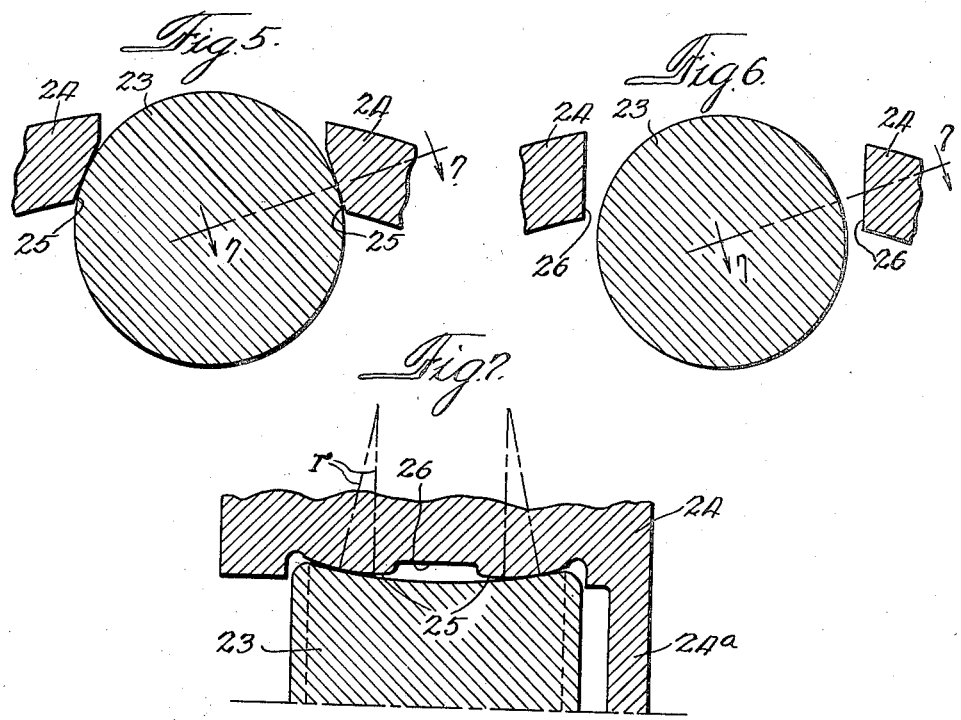

Dec. 31, 1940.  J. M. BRYANT  2,227,064
ANTIFRICTION BEARING
Filed July 27, 1940  3 Sheets-Sheet 3
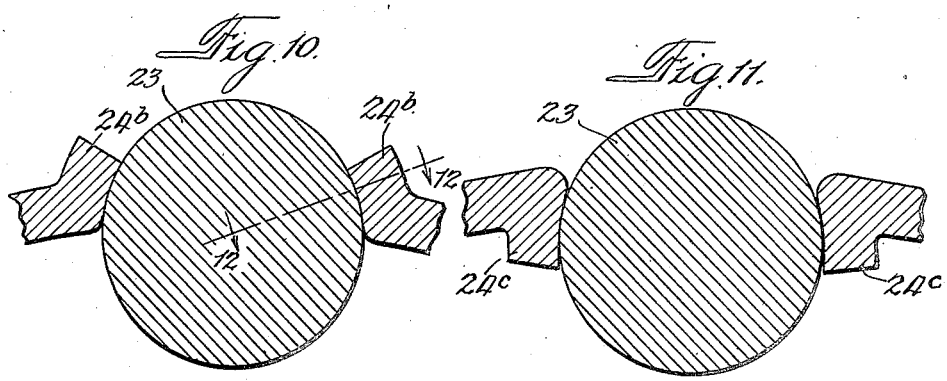
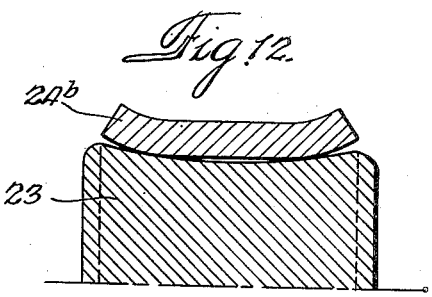
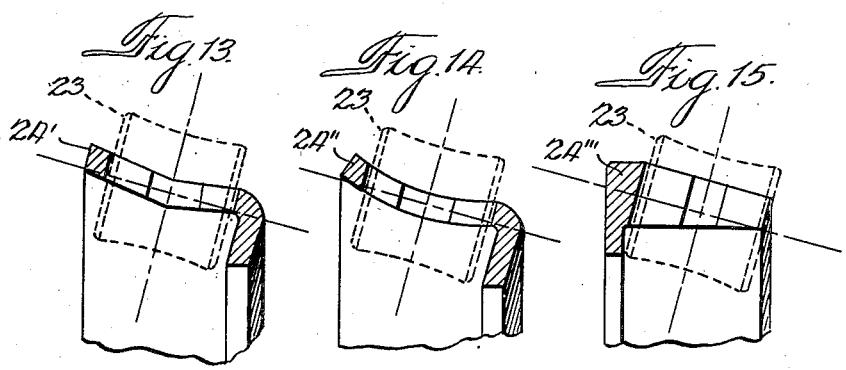
Inventor
Jerrus M. Bryant.
By: Thiess, Olson & Mecklenburger.
Attys.

Patented Dec. 31, 1940

2,227,064

UNITED STATES PATENT OFFICE 2,227,064

ANTIFRICTION BEARING

Jerrus M. Bryant, Indianapolis, Ind., assignor to Shafer Bearing Corporation, Chicago, Ill., a corporation of Illinois Application July 27, 1940, Serial No. 347,963

15 Claims. (Cl. 308—217)

This invention relates to antifriction bearings and has particular relation to improvements in retainers for bearings of the type employing concave-surfaced rollers as antifriction elements.

Bearings of the concave roller type, which are noted particularly for their self-alignment feature, have heretofore been provided with retaining members having contact with the end portions of the rollers, which in some cases are additional portions provided simply for that purpose, or with substantial portions of the load-bearing surfaces of such rollers throughout the maximum load zones thereof. The purpose of the retaining member is to maintain the rollers in proper relative positions while the bearing is in operation as well as while it is at rest, and to accomplish this result with a minimum of friction and consequent wear and without interfering any more than necessary with the lubrication of the bearing.

According to the present invention, retaining members are formed to contact with the lubricated bearing surfaces of the rollers, at points removed, however, from the maximum load zone, and preferably with substantially point contact, or in some cases with substantially line contact, rather than extended surface contact. These conditions are achieved by forming those portions of the retaining member which come into contact with the rollers, with surfaces of such shape relative to the roller surfaces that the extent and location of the points of contact are predetermined as desired.

The principal object of the present invention, therefore, is to provide an antifriction bearing of the above indicated character in which the retaining member is so formed as to serve most effectively in the positioning or guiding of the bearing rollers and to function most efficiently with regard to the lubrication of the bearing, so that a minimum of wear of the bearing elements, including the retaining member, is occasioned in the use of the bearing, and without involving the provision of additional portions on the bearing rollers to be engaged by the retaining member.

A further object is to provide a retaining member for a bearing of the above indicated character which is light in weight, of long life, economical to manufacture, and easy to assemble with the other elements of the bearing.

The invention will be better understood and other objects and advantages of the same will appear from a consideration of the detailed description set forth hereinafter, in conjunction with the accompanying drawings, in which:

Fig. 1 is a half sectional view of a single-row antifriction bearing embodying the invention, taken through the longitudinal axis of such bearing;

Fig. 2 is a half sectional view similarly taken of a double-row bearing likewise embodying the invention;

Fig. 3 is a side elevational view of the upper half of a retaining member such as is embodied in the bearings shown in Figs. 1 and 2;

Fig. 4 is a fragmentary elevational view, on an enlarged scale, of one of the bearing rollers and adjacent portions of the retaining member, looking outwardly from the inside of the retaining member as indicated at 4—4 in Fig. 1;

Fig. 5 is a sectional view on the same scale as Fig. 4 of one of the rollers and adjacent portions of the retaining member, taken on the plane indicated at 5—5 in Fig. 1;

Fig. 6 is a sectional view similarly taken on the plane indicated at 6—6 in Fig. 1;

Fig. 7 is a fragmentary sectional view taken on the plane indicated at 7—7 in Figs. 1, 5 and 6 and on the same scale as the latter two figures;

Figs. 8, 9, 10 and 11 are sectional views taken similarly to Fig. 5 and on a similarly enlarged scale, illustrating certain modifications in the construction shown therein;

Fig. 12 is a fragmentary sectional view taken on the plane indicated at 12—12 in Fig. 10, in the same manner that Fig. 7 is taken with reference to Figs. 1, 5 and 6; and Figs. 13, 14 and 15 are fragmentary sectional views of retaining members embodying certain other modifications in construction.

Referring to the drawings, the bearing illustrated in Fig. 1 comprises an inner race member 21 having a substantially spherically curved bearing surface, an outer race member 22 having a convex bearing surface of curvature complementary to that of the inner race member, and a series of concave-surfaced bearing rollers 23 co-acting between said race members. The longitudinally concave curvature of the rollers 23 is such as to conform to the convex curvature of the bearing surfaces of the race members, or nearly so, and the spherical curvature of the inner race member provides for the desired self-alignment of the bearing. The rollers are maintained in proper operating position between the race members by means of a retaining member 24, which may be a steel stamping or the like, having individual perforations through which the respective rollers extend. The retainer is preferably strengthened by an inwardly turned flange 24ᵃ as shown.

The double-row bearing shown in Fig. 2 embodies a duplication of the same elements except that a double inner race member 21' and a double outer race member 22' are provided.

As shown in Figs. 3, 4 and 7, the longitudinal edges of the roller-receiving apertures in the retaining member 24 are formed by portions 25 presenting surfaces toward the bearing surfaces of the rollers which are convexly curved with respect to the longitudinal extent of the rollers. These portions at each longitudinal edge of each aperture are located on opposite sides of the transverse axis of the aperture and of the corresponding roller and are separated by cut-back or relieved sections 26. The longitudinal curvature of the roller-contacting surfaces of the portions 25 is preferably, although not necessarily in all cases, of shorter radius than the longitudinal curvature of the rollers 23, such, for example, as the radius indicated at $r$ in Fig. 7. The contour of the surfaces 25 in planes transverse to the roller axes may be varied, but a desirable form is that shown in Fig. 5, wherein such surfaces have straight elements in such transverse planes.

The retainer apertures are substantially longer than the rollers, as shown, so that clearance is provided between the retainer and the end surfaces of the rollers.

In the form of construction described above, it will be seen that the contacting portions 25 of the retainer 24 have straight-line tangential contact with the bearing surfaces of the rollers 23 transversely thereof and convex tangential contact therewith in a longitudinal direction. Consequently, the contact between the rollers and the retainer is substantially point contact. Such contact occurs at each longitudinal edge of each roller-receiving aperture in the retaining member, at points spaced on either side of the transverse axis of the respective roller. The retainer is located outwardly of the frusto-conical surface in which the axis of all of the rollers are located, and therefore the points of contact between the rollers and the retainer are substantially outside the roller axes, with reference to the longitudinal axis of the entire bearing assembly.

Between the contacting portions 25 on each side of each roller substantial clearance between the roller and the retainer is provided by the cut-away sections 26 so that contact along the middle portion of the roller, which is the maximum load zone, is avoided. This condition is also illustrated in Fig. 6. Contact between the retainer and the end surfaces of the rollers is likewise avoided by the end clearance previously mentioned.

This form of construction provides very effective guiding of the roller movement in the operation of the bearing because the guiding contact occurs at points well removed from the transverse axes of the rollers. Consequently, skewing of the rollers is effectively prevented. Moreover, the location of the points of contact on the concave roller surfaces is such that the retainer exerts an axial control on the rollers when the same are out of the load-bearing zone, and thus axial displacement is prevented and contact between the retainer and the ends of the rollers does not occur. The elimination of friction and consequent wear which would be caused by such contact is, of course, an important advantage.

The relief or cutting-back of the retainer along the maximum load zone of the rollers serves to permit unrestricted supply of lubricant to the rollers throughout such zone and eliminates all friction and wear due to retainer contact in that location. Since the contact is restricted to points or extremely small areas, such friction and wear as do occur are very slight and are further minimized by reason of the fact that lubricant may be supplied freely to all parts of the roller surface, without obstruction by the retainer. At the same time, the removal of the contact points inwardly from the extremities of the bearing surfaces of the rollers, where the diameter thereof reaches its maximum, reduces the rubbing speed for any given speed of operation of a bearing and thereby effects a reduction of friction and wear in that direction also. All of these factors contribute to increased efficiency and reliability in the operation of bearings embodying the present invention, as well as imparting increased life to such bearings by reducing the wear on the contacting parts.

As above mentioned, the contour of the contacting surfaces 25 in planes transverse to the roller axes may be varied, and some suitable variations thereof are shown in Figs. 8, 9, 10 and 11.

In Fig. 8 the said surfaces, designated as 25ᵃ, are made concave in the direction referred to, the radius of such curvature being somewhat greater than that of the bearing rollers, as indicated, for example, at $r_1$. Accordingly, tangential contact is obtained between the curved roller and retainer surfaces having different radii.

In Fig. 9 the corresponding surfaces, designated as 25ᵇ, are shown as being convex, on a radius indicated by way of example at $r_2$, thus also producing tangential contact.

In the modification shown in Figs. 10 and 12 the retainer is formed with outwardly extending wings 24ᵇ and the roller-contacting inner surfaces of these wings are shown as conforming to the transverse curvature of the rollers. Such wings may be bent along the length thereof, as shown in Fig. 12, to relieve them from contact with the rollers along the middle portions of the latter and to provide convex bearing portions at locations spaced on either side of the transverse axes of the rollers. Thus the same relationship as that illustrated in Fig. 7 is obtained, without the necessity of cutting the retainer material away opposite the mid-sections of the rollers, and in this way a stronger wing structure may be provided. The provision of wings on the retainer permits the use of lighter material for this element without undue sacrifice in the strength thereof. It will be seen that in this form of construction the contact between the retainer and the rollers is in the nature of line contact in planes transverse to the roller axes.

Fig. 11 illustrates another modification in which wings may be formed on the retainer, but in this case the wings are turned inwardly, as shown at 24ᶜ, instead of outwardly. This type of construction may be utilized to advantage where it is desired to bring the contact of the retainer down to the vicinity of diametrically opposite points on the rollers, in order to guide the movement thereof particularly effectively.

Figs. 13 and 14 show further modifications in which the last mentioned result is obtained in different ways, the normal operating position of one of the rollers 23 being indicated in dotted lines in each of these views. In both of these modifications the main body portion of the retainer, instead of being of frusto-conical formation, is peripherally dished so that the mid-section thereof is brought inwardly to a position closer to the main axis of the bearing than are the end portions thereof. As shown in Fig. 13, this may be done by forming the larger end of the retaining member, here designated as 24', with a frusto-conical surface of steeper inclination than that of the smaller end of said member, while Fig. 14 shows the accomplishment of a similar purpose by forming the main body portion of the retainer in this case designated as 24'', along substantially arcuate lines located in planes which are disposed radially with respect to the longitudinal axis of the retainer. It will be observed that in the forms of construction shown in both Figs. 13 and 14 the portions of the retainer which contact with the rollers are brought down to the vicinity of diametrically opposite points on the roller periphery without the provision of wings as shown in Figs. 10, 11 and 12, and without utilizing as heavy a gauge of material for the retainer as would be necessary to accomplish this result if the retainer were of single frusto-conical formation.

Reference has been made hereinbefore to retainers made of steel stampings or the like. The invention is likewise applicable, however, to retainers made of other materials or in other ways, and Fig. 15 illustrates a retainer, designated as 24''', which may be made of bronze or other metals, by casting, forging, or the like. As shown in this view, the perforations which receive the rollers may be open at one end if desired.

The modified forms of retainers described above may be made to embody any of the applicable features previously disclosed herein, and it will be understood that in all cases the various modifications of construction hereinbefore disclosed may be combined with or substituted for one another as may be desired.

It will be seen from the foregoing description that the present invention embodies features in the construction of antifriction bearings of the concave roller type involving important improvements and advantages in the manufacture and use of such bearings.

While only certain specific embodiments of the invention have been illustrated and described herein, it will be readily understood by those skilled in the art that various other modifications and changes may be made therein without departing from the spirit and scope of the invention as set forth in the appended claims.

What is claimed as new and is desired to secure by Letters Patent, therefore, is:

1. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, the surfaces of said portions so engaging the rollers being longitudinally convex.

2. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, the surfaces of said portions so engaging the rollers being longitudinally convex on a curvature of shorter radius than the longitudinal concave curvature of the rollers.

3. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers but spaced inwardly from the extremities of said bearing surfaces, the surfaces of said portions so engaging the rollers being longitudinally convex on a curvature of shorter radius than the longitudinal concave curvature of the rollers.

4. An antifriction bearing comprising a pair of race members, a plurality of rollers with longitudinally concave bearing surfaces operatively disposed therebetween, and a retaining member having an opening therein to receive each of said rollers and formed with two longitudinally spaced portions at each longitudinal side of said openings engaging the concave bearing surfaces of said rollers in spaced zones located on opposite sides of the transverse axes of said rollers, the surfaces of said portions so engaging the rollers being longitudinally convex on a curvature of shorter radius than the longitudinal concave curvature of the rollers.

5. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers with substantially point contact in spaced zones located on opposite sides of the transverse axes of said rollers.

6. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers with substantially line contact in spaced zones located on opposite sides of the transverse axes of said rollers.

7. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers with substantially line contact in spaced planes located on opposite sides of the transverse axes of said rollers and parallel to such transverse axes.

8. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings tangentially engaging the concave bearing surfaces of said rollers in spaced zones located on opposite sides of the transverse axes of said rollers.

9. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, with tangential contact in planes passing through the longitudinal axes of the respective rollers.

10. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, with tangential contact in planes transverse to the longitudinal axes of the respective rollers.

11. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, with tangential contact both in planes passing through the longitudinal axes of the respective rollers and in planes transverse thereto.

12. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, the surfaces of said portions so engaging the rollers being longitudinally convex on a curvature of shorter radius than the longitudinal concave curvature of the rollers, and the material of the retaining member being cut back between said portions to provide relatively large clearance between the retaining member and the rollers through the maximum load zones of the latter.

13. An antifriction bearing comprising a pair of race members, a plurality of rollers with longitudinally concave bearing surfaces operatively disposed therebetween, and a retaining member having an opening therein to receive each of said rollers and formed with wings having a plurality of longitudinally spaced portions at each longitudinal side of said openings engaging the concave bearing surfaces of said rollers in spaced zones located on opposite sides of the transverse axes of said rollers, the surfaces of said wing portions so engaging the rollers being longitudinally convex on a curvature of shorter radius than the longitudinal concave curvature of the rollers.

14. An antifriction bearing comprising a pair of race members, a plurality of rollers with longitudinally concave bearing surfaces operatively disposed therebetween, and a retaining member having an opening therein to receive each of said rollers and formed with wings bent to provide a plurality of longitudinally spaced portions at each longitudinal side of said openings engaging the concave bearing surfaces of said rollers in spaced zones located on opposite sides of the transverse axes of said rollers and relieved portions therebetween, the surfaces of said wing portions so engaging the rollers being longitudinally convex on a curvature of shorter radius than the longitudinal concave curvature of the rollers.

15. An antifriction bearing comprising a pair of race members, a plurality of rollers with longitudinally concave bearing surfaces operatively disposed therebetween, and a retaining member having an opening therein to receive each of said rollers and formed with a plurality of longitudinally spaced portions at each longitudinal side of said openings engaging the concave bearing surfaces of said rollers in spaced zones located on opposite sides of the transverse axes of said rollers, the surfaces of said portions so engaging the rollers being longitudinally convex on a curvature of shorter radius than the longitudinal concave curvature of the rollers and said retaining member being peripherally dished to bring the mid-section thereof closer to the main axis of the bearing than are the end portions thereof, thereby effecting contact of the retaining member with the rollers in the vicinity of diametrically opposite points on the latter.

JERRUS M. BRYANT.